United States Patent
Armangau et al.

(10) Patent No.: US 12,299,287 B2
(45) Date of Patent: May 13, 2025

(54) PROVIDE HOST APPLICATIONS ABILITY TO DYNAMICALLY MANAGE APPLICATION SPECIFIC FUNCTIONALITY ON STORAGE APPLICATION

(71) Applicant: Dell Products L.P., Round Rock, TX (US)

(72) Inventors: Philippe Armangau, Kalispell, MT (US); Alan L. Taylor, Cary, NC (US); Vasu Subramanian, Chapel Hill, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/082,032

(22) Filed: Dec. 15, 2022

(65) Prior Publication Data
US 2024/0201856 A1 Jun. 20, 2024

(51) Int. Cl.
*G06F 3/06* (2006.01)
*G06F 13/36* (2006.01)

(52) U.S. Cl.
CPC .......... *G06F 3/0613* (2013.01); *G06F 3/0605* (2013.01); *G06F 3/0656* (2013.01); *G06F 3/0659* (2013.01); *G06F 3/0673* (2013.01); *G06F 13/36* (2013.01); *G06F 2213/0036* (2013.01)

(58) Field of Classification Search
None
See application file for complete search history.

(56) References Cited

U.S. PATENT DOCUMENTS

| | | | |
|---|---|---|---|
| 10,678,465 B2 | 6/2020 | Feng et al. | |
| 10,956,346 B1 * | 3/2021 | Ben-Yehuda | ....... G06F 13/4027 |
| 11,281,374 B2 | 3/2022 | Krivenok | |
| 11,438,413 B2 | 9/2022 | Sohail et al. | |
| 11,461,012 B2 | 10/2022 | Feng et al. | |
| 11,467,765 B2 | 10/2022 | Rao et al. | |

(Continued)

OTHER PUBLICATIONS

SNIA. "Computational Storage API." Jun. 2022. SNIA. Version 0.8 Rev 0.*

(Continued)

*Primary Examiner* — Nathan Sadler
(74) *Attorney, Agent, or Firm* — BainwoodHuang

(57) ABSTRACT

Techniques for providing host applications the ability to dynamically manage application-specific functionality of storage applications. The techniques include providing, on a storage system, a storage application such as a data object processing pipeline including a series of pipeline elements (PEs), and receiving, at the storage system from a host computer, a command containing parameters for configuring an application of a specified PE from among the series of PEs. The techniques further include, in response to receipt of the command, configuring, by the storage system, the application of the specified PE based on the parameters contained in the command, executing the data object processing pipeline including the application of the specified PE on end-user data, and sending, by the storage system to the host computer, a command containing verification information pertaining to execution of the data object processing pipeline and/or information pertaining to processing or memory resources of the storage system.

14 Claims, 7 Drawing Sheets

(56) References Cited

U.S. PATENT DOCUMENTS

| | | | |
|---|---|---|---|
| 11,687,253 B2* | 6/2023 | Pol | G06F 3/0607 |
| | | | 711/164 |
| 2012/0072924 A1* | 3/2012 | Khanvilkar | G06F 13/4221 |
| | | | 719/326 |
| 2019/0042594 A1* | 2/2019 | Trika | G06F 16/1834 |
| 2020/0310694 A1* | 10/2020 | Gao | G06F 3/0683 |
| 2022/0066821 A1* | 3/2022 | Pinto | G06F 9/5005 |
| 2022/0236911 A1* | 7/2022 | Jones | G06F 3/0679 |
| 2022/0318160 A1* | 10/2022 | Jones | G06F 13/4282 |
| 2022/0365709 A1* | 11/2022 | Raghunath | G06F 3/0679 |
| 2022/0391224 A1* | 12/2022 | Pinto | G06F 9/541 |
| 2022/0398442 A1* | 12/2022 | Jones | G06N 3/08 |
| 2023/0020163 A1* | 1/2023 | Esmaeilzadeh | H04L 63/0407 |
| 2023/0088291 A1* | 3/2023 | Tsuji | G06F 3/0604 |
| | | | 711/154 |
| 2024/0020029 A1* | 1/2024 | Bert | G06F 3/0607 |

OTHER PUBLICATIONS

SNIA. "Computational Storage Architecture and Programming Model." Aug. 2022. SNIA. Version 1.0.*

SNIA. The 2016 SNIA Dictionary. Apr. 2016. SNIA. pp. 4, 181-182, 264-265.*

Vincon et al. "Near-Data Processing in Database Systems on Native Computational Storage under HTAP Workloads." Jun. 2022. ACM. Proceedings of the VLDB Endowment. vol. 15. pp. 1991-2004.*

* cited by examiner

| Bytes/bits | Bit 7 | Bit 6 | Bit 5 | Bit 4 | Bit 3 | Bit 2 | Bit 1 | Bit 0 |
|---|---|---|---|---|---|---|---|---|
| Byte 0 | Command code for SCSI write buffer command ⟶ 202 |||||||||
| Byte 1 | Logical unit number (LUN) ⟶ 204 |||||||||
| Byte 2 | Indication that command is for a non-SCSI defined task ⟶ 206 |||||||||
| Bytes 3-4 | Synchronization code or value ⟶ 208 |||||||||

| Bytes/bits | Bit 7 | Bit 6 | Bit 5 | Bit 4 | Bit 3 | Bit 2 | Bit 1 | Bit 0 |
|---|---|---|---|---|---|---|---|---|
| Bytes 0-1 | Identification of PE application configuration command ⟶ 210 |||||||||
| Bytes 2-3 | Synchronization code or value ⟶ 212 |||||||||
| Bytes 4-5 | Indication of length of additional data or information ⟶ 214 |||||||||

| Bytes/bits | Bit 7 | Bit 6 | Bit 5 | Bit 4 | Bit 3 | Bit 2 | Bit 1 | Bit 0 |
|---|---|---|---|---|---|---|---|---|
| Bytes 0-1 | Indication of special system call ||||||||
| Bytes 2-3 | Special system call name ||||||||
| Byte 4 | Flag indicating whether amount of additional data or information > X bytes ||||||||
| Bytes 5-6 | Indication of length of additional data or information ||||||||
| Bytes 7-m | Additional data or information (parameter values, strings, scripts) ||||||||

| Bytes/bits | Bit 7 | Bit 6 | Bit 5 | Bit 4 | Bit 3 | Bit 2 | Bit 1 | Bit 0 |
|---|---|---|---|---|---|---|---|---|
| Byte 0 | Command code for SCSI read buffer command | | | | | | | |
| Byte 1 | Logical unit number (LUN) | | | | | | | |
| Byte 2 | Indication that command is for a non-SCSI defined task | | | | | | | |
| Bytes 3-4 | Synchronization code or value | | | | | | | |

| Bytes/bits | Bit 7 | Bit 6 | Bit 5 | Bit 4 | Bit 3 | Bit 2 | Bit 1 | Bit 0 |
|---|---|---|---|---|---|---|---|---|
| Bytes 0-1 | Identification of PE application configuration command | | | | | | | |
| Bytes 2-3 | Synchronization code or value | | | | | | | |
| Bytes 4-5 | Indication of length of additional data or information | | | | | | | |

PROVIDE HOST APPLICATIONS ABILITY TO DYNAMICALLY MANAGE APPLICATION SPECIFIC FUNCTIONALITY ON STORAGE APPLICATION

BACKGROUND

Storage systems include storage processing circuitry and arrays of storage devices such as solid-state drives (SSDs), hard disk drives (HDDs), optical drives, and so on. The storage processing circuitry typically services storage input/output (IO) requests generated by client (or host) computers communicably coupled by at least one network to the storage systems. The storage IO requests (e.g., read requests, write requests) specify data blocks, data files, data pages, or other data objects to be read from or written to volumes (VOLs), logical units (LUNs), filesystems, or other storage objects maintained on the storage devices. The data objects may be derived from data collected over the Internet of Things (IOT), which is a network of distributed physical computerized devices (also referred to herein as "IoT devices") configured to sense and collect data or other information for use in processes such as surveillance, medical and transportation monitoring, and home and factory monitoring and control. By analyzing the collected data, useful insights may be obtained regarding process efficiency and cost, identification and prevention of potential process bottlenecks, faulty equipment or machinery, and so on.

SUMMARY

In an IoT environment, many IoT devices (e.g., up to a million or more) can stream their collected data over the IoT network to at least one volume or LUN maintained on a storage system. Further, client (or host) computers can issue requests to the storage system to read the collected data from the volume or LUN, perform processing on the collected data such as cleaning missing or faulty data, pruning irrelevant data, tagging or marking data, and/or other data processing operations, and issue requests to write the processed data back to at least one volume or LUN maintained on the storage system for subsequent use or analysis. The amount of data collected by such IoT devices and streamed to the storage system can be enormous, however, possibly exceeding the available network bandwidth. Moreover, the servicing of a multitude of read and write requests issued by host computers to access such an enormous amount of data from the storage system can be costly in terms of storage processing time and resources.

To address these shortcomings, techniques are disclosed herein that provide a storage application, namely, a data object processing pipeline, which can be implemented on the storage system with a series of functional units referred to herein as "pipeline processing components" or "pipeline elements (PEs)." In the disclosed techniques, each pipeline element (PE) can have several components including a data object processing application (or PE application) and a storage queue. During data ingest in an IoT environment, many IoT devices can generate, over the IoT network, data write events to a first PE of the data object processing pipeline, causing data objects to be successively written to a storage queue of the first PE. The writing of data objects to the storage queue can automatically trigger execution of a PE application of the first PE, causing at least one data object to be read from the storage queue and first processing to be performed on the data object by the PE application. Having performed the first processing on the data object at the first PE, the PE application of the first PE can generate a data write event to a second PE of the data object processing pipeline, causing the first processed data object to be written to a storage queue of the second PE. The writing of data objects to the storage queue of the second PE can likewise automatically trigger execution of a PE application of the second PE, causing at least one data object to be read from the storage queue of the second PE and second processing to be performed on the data object by the PE application of the second PE. Such generation of data write events and processing of data objects can continue at one or more subsequent successive PEs of the data object processing pipeline until a last PE is reached, at which point the multiply processed data objects can be stored to a volume or LUN maintained on the storage system. The multiply processed data objects can then be provided from the storage system to a host computer for subsequent use or analysis.

The disclosed techniques further provide a host application running on a host computer with the ability to dynamically manage or control application-specific functionality of the storage application, such as the data object processing pipeline. In the disclosed techniques, the host computer can include at least one function library and a multipath component, which can have a pluggable architecture for supporting multiple customized plugins that use the function library. The function library can be loaded onto the host computer, linked to the host application, and executed to issue or send commands to the customized plugin components for dynamically controlling the application-specific functionality of the data object processing pipeline. The disclosed techniques can include calling the function library by the host application, causing the function library to be loaded onto the host computer and linked to the host application. Once the function library has been loaded and linked to the host application, the disclosed techniques can include executing, by the host application, a selected function from the function library, causing at least one first command to be issued or sent to a specified one of multiple customized plugins of the multipath component. The first command sent to the specified plugin can include parameters or strings for use in configuring a PE application of a specified one of the series of PEs of the data object processing pipeline. In response to receipt of the first command at the specified plugin, the disclosed techniques can include building, by the specified plugin, a second command or command block (e.g., SCSI write buffer command) containing at least the parameters or strings for configuring the PE application, and sending, by the specified plugin, the second command from the host computer to the storage system. In response to receipt of the second command at the storage system, the disclosed techniques can include configuring, by storage processing circuitry, the PE application of the specified PE based at least on the parameters or strings contained in the second command, and executing, by the storage processing circuitry, the data object processing pipeline including the PE application of the specified PE to process data objects, such as those derived from data or other information collected by many IoT devices. The disclosed techniques can include sending, by the storage system to the host computer, a command or command block (e.g., SCSI read buffer command) containing verification information pertaining to execution of the data object processing pipeline and/or data or information pertaining to processing or memory resources of the storage system.

By providing, on a storage system, a data object processing pipeline including a series of pipeline elements (PEs), receiving, at the storage system from a host computer, a command containing parameters or strings for use in configuring an application of a specified PE from among the series of PEs, configuring, in response to receipt of the command, the application of the specified PE based at least on the parameters or strings contained in the command, and executing the data object processing pipeline including the application of the specified PE on end-user (e.g., host) data, host computers can be allowed to dynamically control functionality of storage applications such as the data object processing pipeline running on remote storage systems for processing and storing their data.

In certain embodiments, a method includes providing a storage application for execution on a storage system, and receiving, at the storage system from a host computer, a command containing parameters or strings for use in configuring the storage application. The method further includes, in response to receipt of the command, dynamically controlling functionality of the storage application by configuring the storage application based on the parameters or strings contained in the command, and executing the storage application on end-user data.

In certain arrangements, the method includes providing the storage application as a data object processing pipeline application.

In certain arrangements, the data object processing pipeline application includes a series of pipeline processing components, and each pipeline processing component has an associated data object processing application. The method further includes configuring the data object processing application of at least one of the series of pipeline processing components based on the parameters or strings contained in the command.

In certain arrangements, the method includes processing the end-user data at each processing element of the series of pipeline processing components.

In certain arrangements, the method includes storing, on the storage system, the processed end-user data for subsequent use or analysis.

In certain arrangements, the method includes receiving, at the storage system from the host computer, the command configured as a small computer system interface (SCSI) write buffer command, in which the parameters or strings are contained in a body of the SCSI write buffer command.

In certain arrangements, the method includes executing the SCSI write buffer command as a SCSI write buffer/read buffer command pair.

In certain arrangements, the method includes sending, by the storage system to the host computer, a SCSI read buffer command portion of the SCSI write buffer/read buffer command pair, in which the SCSI read buffer command portion contains verification information pertaining to execution of the SCSI write buffer command and/or data or information pertaining to processing or memory resources of the storage system.

In certain embodiments, a storage system includes a memory containing a storage application, and processing circuitry configured to execute program instructions out of the memory to receive, from a host computer, a command containing parameters or strings for use in configuring the storage application, in response to receipt of the command, to dynamically control functionality of the storage application by configuring the storage application based on the parameters or strings contained in the command, and to execute the storage application on end-user data.

In certain arrangements, the storage application is configured as a data object processing pipeline application.

In certain arrangements, the data object processing pipeline application includes a series of pipeline processing components, each pipeline processing component has an associated data object processing application, and the processing circuitry is configured to execute the program instructions out of the memory to configure the data object processing application of at least one of the series of pipeline processing components based on the parameters or strings contained in the command.

In certain arrangements, the processing circuitry is configured to execute the program instructions out of the memory to process the end-user data at each processing element of the series of pipeline processing components.

In certain arrangements, the storage system includes a storage device configured to maintain a storage object, and the processing circuitry is configured to execute the program instructions out of the memory to store, on the storage object, the processed end-user data for subsequent use or analysis.

In certain arrangements, at least one pipeline processing component of the series of pipeline processing components has an associated storage queue, and the processing circuitry is configured to execute the program instructions out of the memory to ingest the end-user data as data objects, and write each data object to the storage queue associated with the pipeline processing component.

In certain arrangements, the processing circuitry is configured to execute the program instructions out of the memory, in response to writing a data object to the storage queue, to automatically trigger execution of the data object processing application associated with the pipeline processing component.

In certain arrangements, the processing circuitry is configured to execute the program instructions out of the memory, in response to automatically triggering execution of the data object processing application, to read at least one data object from the storage queue, and to perform specified processing on the data object.

In certain arrangements, the processing circuitry is configured to execute the program instructions out of the memory, in response to performing the specified processing on the data object, to write the data object to a next pipeline processing component in the series of pipeline processing components or to a storage queue associated with the next pipeline processing component.

In certain embodiments, a computer program product includes a set of non-transitory, computer-readable media having instructions that, when executed by processing circuitry, cause the processing circuitry to perform a method including providing a storage application for execution on a storage system, receiving, at the storage system from a host computer, a command containing parameters or strings for use in configuring the storage application, in response to receipt of the command, dynamically controlling functionality of the storage application by configuring the storage application based on the parameters or strings contained in the command, and executing the storage application on end-user data.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 2a is a diagram of an exemplary SCSI write buffer command for use by a host application in configuring an application of a pipeline element (PE) included in the data object processing pipeline of FIG. 1b;

FIG. 2b is a diagram of an exemplary header of the SCSI write buffer command of FIG. 2a;

FIG. 2c is a diagram of an exemplary body of the SCSI write buffer command of FIG. 2a;

FIG. 3a is a diagram of an exemplary SCSI read buffer command for use by the storage system of FIGS. 1a and 1b in providing feedback or information to the host application;

FIG. 3b is a diagram of an exemplary header of the SCSI read buffer command of FIG. 3a;

FIG. 3c is a diagram of an exemplary body of the SCSI read buffer command of FIG. 3a.

DETAILED DESCRIPTION

Techniques are disclosed herein for providing client (e.g., host) applications the ability to dynamically manage application-specific functionality of storage applications. The disclosed techniques can include providing, on a storage system, a storage application such as a data object processing pipeline that includes a series of pipeline elements (PEs), and receiving, at the storage system from a host computer, a command containing parameters or strings for use in configuring an application of a specified PE from among the series of PEs. The disclosed techniques can further include, configuring, in response to receipt of the command, the application of the specified PE based at least on the parameters or strings contained in the command, and executing the data object processing pipeline including the application of the specified PE on end-user (e.g., host) data. In this way, host computers can be allowed to dynamically control functionality of storage applications running on remote storage systems for processing and storing their data.

Figure 1A:
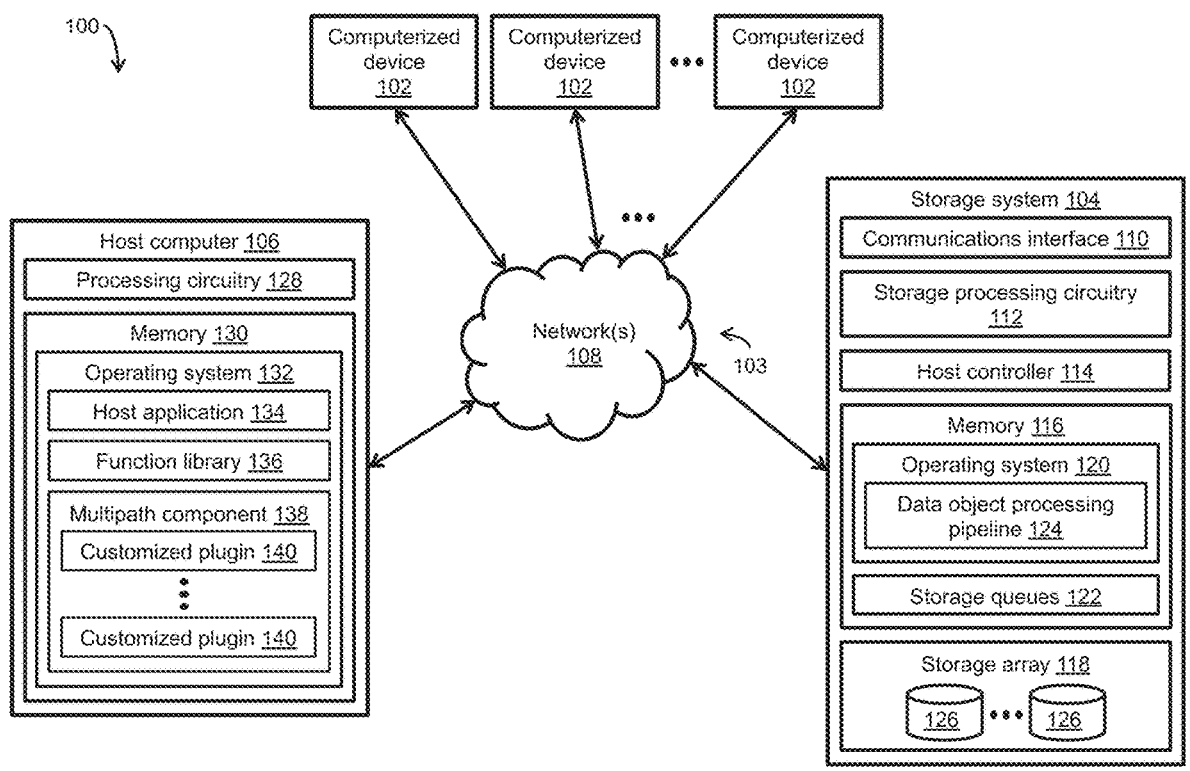
FIG. 1a is a block diagram of an exemplary storage environment, in which techniques can be practiced for providing client (e.g., host) applications the ability to dynamically manage application-specific functionality of storage applications.

FIG. 1a depicts an illustrative embodiment of an exemplary storage environment 100 for providing client (e.g., host) applications the ability to dynamically manage application-specific functionality of storage applications. As shown in FIG. 1a, the storage environment 100 can include a plurality of computerized devices 102 and a host computer 106, each of which can be communicably coupled to a storage system 104 by a communications medium 103 that includes at least one network 108. In one embodiment, the storage environment 100 can include an IoT environment, the network(s) 108 can include an IoT network, and the plurality of computerized devices 102 can include many IoT devices (e.g., up to a million or more). For example, each such IoT device may include at least one sensor configured to monitor one or more conditions within the IoT environment and collect data for transmission over the IoT network to the storage system 104. Such IoT devices can include consumer IoT devices (e.g., smart televisions, smart speakers, toys, wearables, smart appliances), enterprise IoT devices (e.g., smart locks, smart thermostats, smart lighting, smart security devices), and/or industrial IoT devices (e.g., assembly line monitors, manufacturing process monitors). The host computer 106 can be configured as a client computer, a server computer, or any other suitable computer or computerized device. The storage system 104 can be configured as a standalone storage system including a single storage appliance, a clustered storage system including two or more storage appliances, a cloud-based storage system, or any other suitable storage system.

As further shown in FIG. 1a, the storage system 104 can include a communications interface 110, storage processing circuitry 112, a host controller 114, a memory 116, and a storage array 118. The communications interface 110 can include an Ethernet interface, an InfiniBand interface, a Fiber Channel interface, or any other suitable communications interface. The communications interface 110 can further include small computer system interface (SCSI) target adapters, network interface adapters, or any other suitable adapters for converting electronic, optical, or wireless signals received over the network(s) 108 to a form suitable for use by the storage processing circuitry 112.

The storage processing circuitry 112 can be configured to process storage input/output (IO) requests (e.g., SCSI commands, network file system (NFS) commands) issued by the host computer 106 and store host data in a redundant array of independent disk (RAID) environment implemented on the storage array 118. The host controller 114 can be configured to manage communications between the host computer 106 and the storage processing circuitry 112.

The storage array 118 can include storage drives 126 such as solid-state drives (SSDs), hard disk drives (HDDs), flash drives, hybrid drives, or any other suitable storage drives. The storage drives 126 can be configured to store volumes (VOLs), logical units (LUNs), virtual volumes (VVOLs), filesystems, or any other suitable storage objects for hosting data storage of host and device applications within the storage environment 100.

The memory 116 of the storage system 104 can include persistent memory (e.g., flash memory, magnetic memory) and non-persistent cache memory (e.g., dynamic random-access memory (DRAM), static random-access memory (SRAM)). The memory 116 can further include an operating system (OS) 120 such as a Linux OS, Unix OS, Windows OS, or any other suitable operating system, as well as a plurality of storage queues 122. The memory 116 can be configured to store a variety of software constructs realized in the form of specialized code and data including a data object processing pipeline 124.

The data object processing pipeline 124 can include a series of functional units referred to herein as "pipeline processing components" or "pipeline elements (PEs)." Each pipeline element (PE) can include or be associated with one or more components including a data object processing application (or PE application) and/or one of the storage queues 122, each of which can be hosted on a volume (VOL) or logical unit (LUN) maintained on the storage system 104. For example, the data object processing pipeline 124 may be part of a hyperconverged system that includes a plurality of virtual containers, such as Docker® containers or any other suitable software containers. Further, each virtual container may include a virtual machine (VM) configured to execute a PE application. During execution, each PE application component of a pipeline element (PE) can perform operations including reading data objects from a storage queue associated with the PE, writing data objects to a storage queue associated with a next PE in the data object processing pipeline 124, and so on. Such specialized code and data stored in the memory 116 can be accessed and/or executed by the storage processing circuitry 112, the host controller 114, and/or virtual machines (VMs) to carry out the techniques and/or methods described herein.

In the context of the storage processing circuitry 112, the host controller 114, and/or the VMs being configured to execute specialized code and data (e.g., program instructions) out of the memory 116, a computer program product can be configured to deliver all or a portion of the program instructions stored and/or maintained in the memory 116 to the storage processing circuitry 112, the host controller 114, and/or the VMs. Such a computer program product can include one or more non-transient computer-readable storage media such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. The non-transient computer-readable storage media can be encoded with sets of program instructions for performing, when executed by the storage processing circuitry 112, the host controller 114, and/or the VMs, the techniques and/or methods described herein.

The host computer 106 can include processing circuitry 128 and a memory 130. The processing circuitry 128 can be configured to generate storage input/output (IO) requests (e.g., SCSI commands, network file system (NFS) commands), and to send the storage IO requests to the storage system 104 for accessing the host data stored on the storage array 118. The memory 130 can include persistent memory (e.g., flash memory, magnetic memory), non-persistent cache memory (e.g., dynamic random-access memory (DRAM), static random-access memory (SRAM)), and an operating system (OS) 132 (e.g., Linux OS, Unix OS, Windows OS). The memory 130 can be configured to store a variety of software constructs realized in the form of specialized code and data including a host application 134, a function library 136, and a multipath component 138, which can include one or more customized plugin components (or plugin(s)) 140. The host application 134 can be directed to a predetermined workflow (e.g., artificial intelligence (AI)/machine learning (ML) workflow) and configured to dynamically manage or control the application-specific functionality of the data object processing pipeline 124 or other storage application running on the storage system 104.

The function library 136 can be implemented as a software module containing custom functions, code, and/or data that can be used by the host application 134. The function library 136 can be called and executed by the host application 134 to issue or send one or more first commands to one or more specified ones of the customized plugins 140 of the multipath component 138. In response to the first command(s) issued or sent by the host application 134, the specified plugin(s) can build second commands in accordance with the SCSI protocol (e.g., SCSI write buffer commands) or any other suitable protocol, and send the second commands over the network(s) 108 to the storage system 104 for dynamically managing or controlling the application-specific functionality of the data object processing pipeline 124 or other storage application. The multipath component 138 can have a pluggable architecture for supporting the customized plugins 140 that use the function library 136. Such specialized code and data stored in the memory 130 can be accessed and/or executed by the processing circuitry 128 and/or virtual machines (VMs) to further carry out the techniques and/or methods described herein.

The communications medium 103 can be configured to interconnect the computerized devices 102 and the host computer 106 with the storage system 104 to enable them to communicate and exchange data and control signaling. As shown in FIG. 1*a*, the communications medium 103 can be illustrated as a "cloud" to represent different network topologies such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof. As such, the communications medium 103 can include copper-based data communications devices and cabling, fiber optic devices and cabling, wireless devices, and so on, or any suitable combination thereof.

Figure 1B:
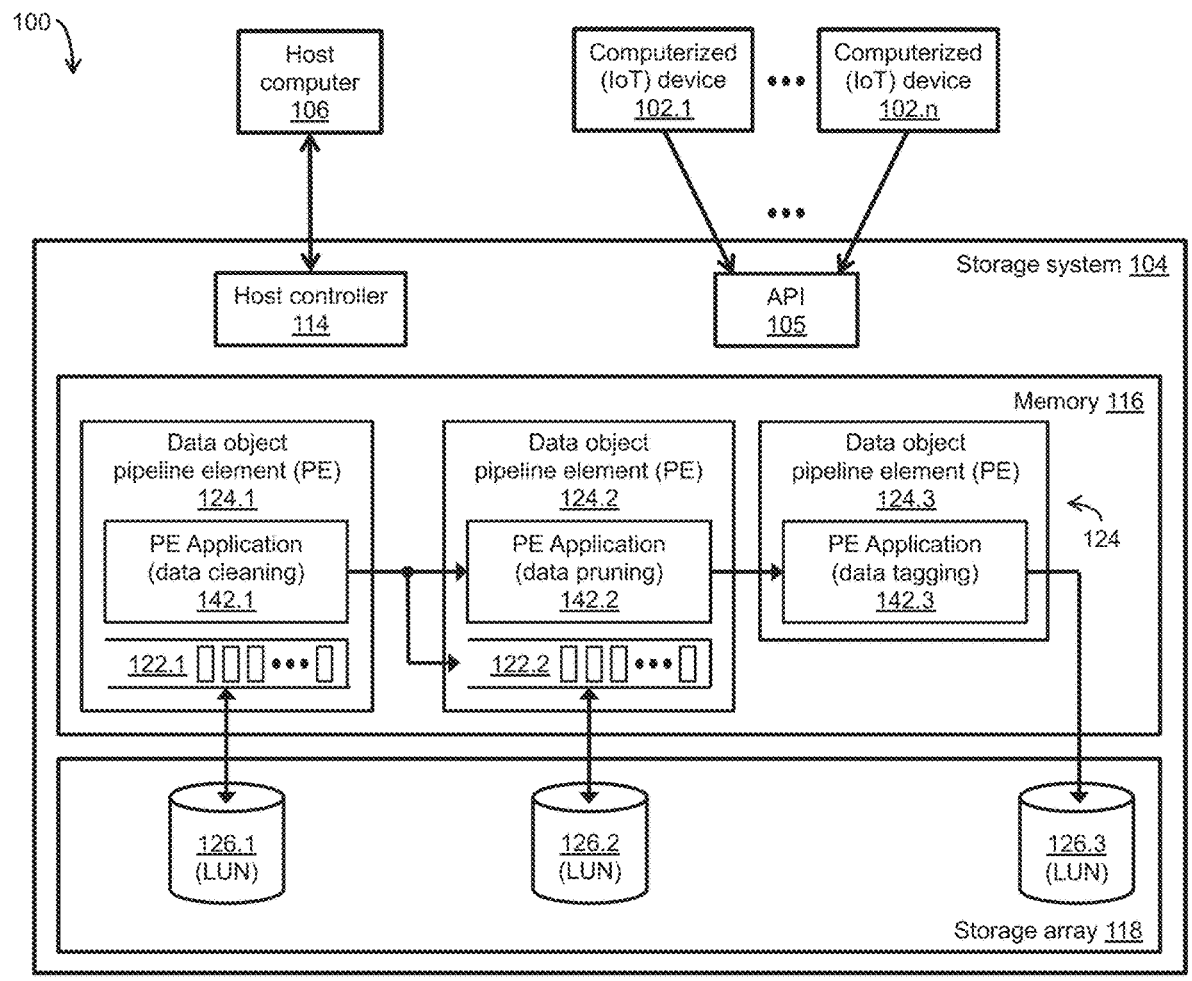
FIG. 1b is a block diagram of a detailed embodiment of an exemplary storage system implemented in the storage environment of FIG. 1a, in which the storage system includes an exemplary data object processing pipeline for processing and storing data objects.

FIG. 1*b* depicts an exemplary detailed embodiment of the storage system 104 implemented in the storage environment 100 of FIG. 1*a*. As shown in FIG. 1*b*, the storage system 104 includes the memory 116 and the storage array 118. In this embodiment, the memory 116 includes the data object processing pipeline 124 with a series of at least three (3) pipeline elements (PEs) 124.1, 124.2, 124.3, and the storage array 118 includes at least three (3) storage drives (e.g., LUNs) 126.1, 126.2, 126.3. The PE 124.1 can include a PE application 142.1 and a storage queue 122.1, which can be hosted on a logical unit (LUN) stored on the storage drive 126.1. Likewise, the PE 124.2 can include a PE application 142.2 and a storage queue 122.2, which can be hosted on a LUN stored on the storage drive 126.2. The PE 124.3 can include at least a PE application 142.3. The PE application 142.1 of the PE 124.1 can read data objects from the storage queue 122.1, write data objects to the storage queue 122.2 of the PE 124.2, as well as perform predetermined first processing (e.g., data cleaning) on the data objects. The PE application 142.2 of the PE 124.2 can read data objects from the storage queue 122.2, write data objects to the PE application 142.3 of the PE 124.3, as well as perform predetermined second processing (e.g., data pruning) on the data objects. The PE application 142.3 of the PE 124.3 can perform predetermined third processing (e.g., data tagging) on data objects, as well as write the data objects to a LUN stored on the storage drive 126.3.

As described herein, the plurality of computerized devices 102 can include many IoT devices such as IoT devices 102.1, . . . , 102.*n*, each of which can include at least one sensor configured to collect data within an IoT environment. Such data collected by the IoT devices 102.1, . . . , 102.*n* can be ingested, via an API 105, at one or more of the PEs 124.1, 124.2, 124.3 of the data object processing pipeline 124. As further described herein, the host computer 106 can send, to the storage system 104, storage IO requests to access host data stored on the storage array 118, as well as commands (e.g., SCSI write buffer commands) to dynamically manage or control the application-specific functionality of the data object processing pipeline 124. In one embodiment, the host controller 114 can be configured to receive the storage IO requests from the host computer 106, and to forward them to the storage processing circuitry 112 for processing. The host controller 114 can be further configured to receive the commands (e.g., SCSI write buffer commands) from the host application 134 running on the host computer 106, to extract information from the commands such as parameters or strings for configuring the PE application of at least one of the PEs 124.1, 124.2, 124.3, and to use at least those parameters or strings to perform the desired configuration(s). In addition, the host controller 114 can be configured to build commands in accordance with the SCSI protocol (e.g., SCSI read buffer commands) or any other suitable protocol, and to send the commands over the network(s) 108 for providing feedback or information to the host computer 106.

During operation in an IoT environment, the IoT devices 102.1, . . . , 102.*n* (see FIG. 1*b*) can generate, over the IoT network, data write events to the PE 124.1 of the data object processing pipeline 124, causing data objects to be successively written to the storage queue 122.1 of the PE 124.1. The writing of data objects to the storage queue 122.1 can automatically trigger execution of the PE application 142.1 of the PE 124.1, causing one or more data objects to be read from the storage queue 122.1 and first processing (e.g., data cleaning) to be performed on the data objects by the PE application 142.1. Having performed data cleaning on the data object at the PE 124.1, the PE application 142.1 can generate a data write event to the PE 124.2 of the data object processing pipeline 124, causing the first processed data object to be written to the storage queue 122.2 of the PE 124.2. The writing of data objects to the storage queue 122.2 of the PE 124.2 can likewise automatically trigger execution of the PE application 142.2 of the PE 124.2, causing one or more data objects to be read from the storage queue 122.2 and second processing (e.g., data pruning) to be performed on the data objects by the PE application 142.2. Such generation of data write events and processing of data objects can continue at one or more subsequent successive PEs of the data object processing pipeline 124 until a last PE, such as the PE 124.3, is reached. The writing of data objects to the PE 124.3 can automatically trigger execution of the PE application 142.3 of the PE 124.3, causing third processing (e.g., data tagging) to be performed on the data objects by the PE application 142.3.

During further operation, the host application 134 running on the host computer 106 can dynamically manage or control the application-specific functionality of the data object processing pipeline 124. Such dynamic management or control of the data object processing pipeline 124 by the host application 134 will be further understood with reference to the following illustrative example and FIGS. 1*a*, 1*b*, 2*a*-2*c*, and 3*a*-3*c*. In this example, it is assumed that the host application 134 executes the function library 136 (see FIG. 1*a*), which interacts with at least one of the customized plugins 140 of the multipath component 138 to share parameters or strings for configuring a PE application of at least one of the PEs 124.1, 124.2, 124.3 of the data object processing pipeline 124. For example, the parameters or strings may be used to configure the PE application 142.1 of the PE 124.1 or any other PE application of the respective PEs 124.1, 124.2, 124.3. Further in this example, such sharing of configuration parameters or strings is accomplished by sending custom input/output control (IOCTL) requests or commands from the function library 136 to the customized plugins 140 to cause them to perform specific operations or tasks.

To that end, the host application 134 running on the host computer 106 calls the function library 136, which, in response, is loaded onto the host computer 106 and linked to the host application 134. Once the function library 136 has been loaded and linked to the host application 134, the host application 134 executes a custom function from the function library 136 to cause an IOCTL command containing the configuration parameters or strings to be issued or sent to one of the customized plugins 140 of the multipath component 138. In response to receipt of the IOCTL command, the customized plugin 140 builds a command containing the parameters or strings for configuring the PE application 142.1 of the PE 124.1. In this example, the command for configuring the PE application 142.1 is built as a SCSI write buffer command. It is noted that a SCSI write buffer command can be built in a similar fashion for use in configuring the PE application 142.2 or the PE application 142.3 of the data object processing pipeline 124.

FIGS. 2*a*-2*c* depict diagrams of an exemplary SCSI write buffer command, which can be built by the customized plugin 140 of the multipath component 138 for configuring the PE application 142.1 of the PE 124.1. In this example, the SCSI write buffer command can have three (3) parts, namely, an initial part 200*a* (see FIG. 2*a*), a header 200*b* (see FIG. 2*b*), and a body 200*c* (see FIG. 2*c*). As shown in FIG. 2*a*, the initial part 200*a* of the SCSI write buffer command can have up to four (4) or more entries 202, 204, 206, 208. The first entry 202 at byte 0 can include a command code for the SCSI write buffer command. The second entry 204 at byte 1 can identify, at bit locations 5-7, one of the logical units (LUNs) 126.1, 126.2, 126.3 included in the storage array 118. The third entry 206 at byte 2 can provide an indication that the SCSI write buffer command is to be used for performing a non-SCSI-defined task, namely, the task of configuring the PE application 142.1 of the PE 124.1. The fourth entry 208 at bytes 3 and 4 can include a synchronization code or value for use in synchronizing the initial part 200*a* of the SCSI write buffer command with the header 200*b* and the body 200*c* of the SCSI write buffer command. For example, the initial part 200*a* of the SCSI write buffer command may be sent by the host application 134 to the host controller 114 during a first bus cycle, and the header 200*b* and the body 200*c* of the SCSI write buffer command may be sent by the host application 134 to the host controller 114 during a second bus cycle.

As shown in FIG. 2*b*, the header 200*b* of the SCSI write buffer command can have up to three (3) or more entries 210, 212, 214. The first entry 210 at bytes 0 and 1 can include an identification of the PE application configuration command. The second entry 212 at bytes 2 and 3 can include the synchronization code or value for use in synchronizing the initial part 200*a* of the SCSI write buffer command with the header 200*b* and the body 200*c* of the SCSI write buffer command. The third entry 214 at bytes 4 and 5 can include an indication of the length of additional data or information contained in the body 200*c* of the SCSI write buffer command. For example, the additional data or information contained in the body 200*c* may include parameter values, strings, scripts, and/or any other suitable data or information.

As shown in FIG. 2*c*, the body 200*c* of the SCSI write buffer command can have up to five (5) or more entries 216, 218, 220, 222, 224. The first entry 216 at bytes 0 and 1 can include an indication that the SCSI write buffer command corresponds to a special system call. The second entry 218 at bytes 2 and 3 can include the special system call name, which, in this example, identifies the PE application configuration command. The third entry 220 at byte 4 can include a flag indicating whether the amount of additional data or information contained in the body 200*c* exceeds a specified number "X" of bytes, such as 16 bytes or any other suitable number of bytes. The fourth entry 222 at bytes 5 and 6 can include an indication of the length of the additional data or information. The fifth entry 224 at bytes 7-m (m>7)

can include the additional data or information (e.g., parameter values, strings, scripts) for use in executing the PE application configuration command. For example, the bytes 7-m included in the entry 224 may span up to 32 kilobytes (kb) or any other suitable number of bytes.

As described herein, the host application 134 executes the function library 136 (see FIG. 1a), which interacts with one of the customized plugins 140 of the multipath component 138 to share parameters or strings for use in configuring the PE application 142.1 of the PE 124.1 (or any other PE application of the respective PEs 124.1, 124.2, 124.3). For example, the PE application 142.1 may be configured to perform data cleaning to remove faulty data from data objects read from the storage queue 122.1. For example, the PE application 142.1 may be configured to perform such cleaning of data objects using the Linux or Unix "grep" command, which can be executed to search for specified strings or patterns in the data objects. As such, the IOCTL command issued or sent by the host application 134 to the customized plugin 140 can include a list of strings to be search for in the data objects. In response to receipt of the IOCTL command, the customized plugin 140 builds a SCSI write buffer command that can include an identification of the grep command in the entry 210 (e.g., bytes 0-1) of the header 200b. The SCSI write buffer command built by the customized plugin 140 can further include at least the list of strings to be searched for in the entry 224 (e.g., bytes 7-m) of the body 200c.

Having built the SCSI write buffer command, the customized plugin 140 sends it from the host computer 106 to the host controller 114, which manages communications between the storage system 104 and the host computer 106 in accordance with the SCSI protocol. Once it receives the SCSI write buffer command from the host computer 106, the host controller 114 initiates execution of the SCSI write buffer command (which includes the grep command), thereby configuring the PE application 142.1 to remove faulty data from the data objects read from the storage queue 122.1 based on the list of strings included in the entry 224 of the body 200c.

In this example, the SCSI write buffer command is executed as a SCSI write buffer/read buffer command pair. For example, the SCSI read buffer command portion of the SCSI write buffer/read buffer command pair may be built by the host controller 114 and used to verify that the SCSI write buffer command executed as expected, as well as to provide any optional data or information about the execution of the SCSI write buffer command and/or the storage system 104 to the host computer 106. For example, such data or information may include information about available storage processing and/or memory resources on the storage system 104 or any other suitable data or information.

Figure 3C:
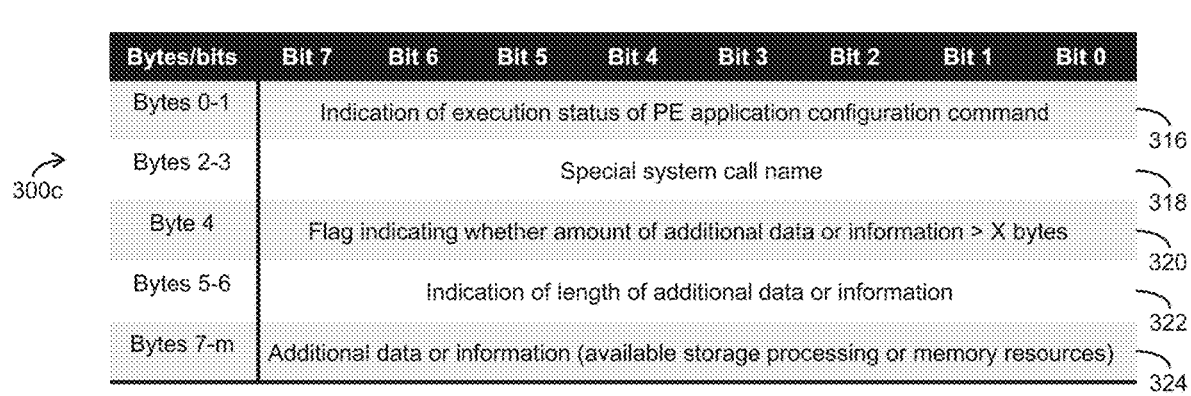

FIGS. 3a-3c depict diagrams of an exemplary SCSI read buffer command, which can be built by the host controller 114 included in the storage system 104. Like the SCSI write buffer command, the SCSI read buffer command can have three (3) parts, namely, an initial part 300a (see FIG. 3a), a header 300b (see FIG. 3b), and a body 300c (see FIG. 3c). As shown in FIG. 3a, the initial part 300a of the SCSI read buffer command can have up to four (4) or more entries 302, 304, 306, 308. The first entry 302 at byte 0 can include a command code for the SCSI read buffer command. The second entry 304 at byte 1 can identify, at bit locations 5-7, one of the logical units (LUNs) 126.1, 126.2, 126.3 included in the storage array 118. The third entry 306 at byte 2 can provide an indication that the SCSI read buffer command is to be used for performing a non-SCSI-defined task, namely, the task of providing information about available storage processing and/or memory resources on the storage system 104. The fourth entry 308 at bytes 3 and 4 can include a synchronization code or value for use in synchronizing the initial part 300a of the SCSI read buffer command with the header 300b and the body 300c of the SCSI read buffer command. For example, the initial part 300a of the SCSI read buffer command may be sent by the host application 134 to the host controller 114 during a third bus cycle, and the header 300b and the body 300c of the SCSI read buffer command may be sent by the host application 134 to the host controller 114 during a fourth bus cycle.

As shown in FIG. 3b, the header 300b of the SCSI read buffer command can have up to three (3) or more entries 310, 312, 314. The first entry 310 at bytes 0 and 1 can include an identification of the PE application configuration command. The second entry 312 at bytes 2 and 3 can include the synchronization code or value for use in synchronizing the initial part 300a of the SCSI read buffer command with the header 300b and the body 300c of the SCSI read buffer command. The third entry 314 at bytes 4 and 5 can include an indication of the length of additional data or information contained in the body 300c of the SCSI read buffer command. For example, the additional data or information contained in the body 300c may include information about the available storage processing and/or memory resources of the storage system 104 or any other suitable data or information.

As shown in FIG. 3c, the body 300c of the SCSI read buffer command can have up to five (5) or more entries 316, 318, 320, 322, 324. The first entry 316 at bytes 0 and 1 can include the indication of the execution status of the SCSI write buffer command portion (e.g., the PE application configuration command) of the SCSI write buffer/read buffer command pair. The second entry 318 at bytes 2 and 3 can include the special system call name, which, in this example, identifies the PE application configuration command. The third entry 320 at byte 4 can include a flag indicating whether the amount of additional data or information contained in the body 300c exceeds a specified number "X" of bytes, such as 16 bytes or any other suitable number of bytes. The fourth entry 322 at bytes 5 and 6 can include an indication of the length of the additional data or information. The fifth entry 324 at bytes 7-m (m>7) can include the additional data or information (e.g., the available storage processing and/or memory resources). For example, the bytes 7-m included in the entry 324 may span up to 32 kb or any other suitable number of bytes.

In this example, it is assumed that the execution status of the SCSI write buffer command (e.g., the PE application configuration command) included in the first entry 316 of the body 300c of the SCSI read buffer command was "successful." Once the PE application 142.1 has been successfully configured, the storage processing circuitry 112 executes the data object processing pipeline 124 to process the data objects derived from data or other information collected by IoT devices 102.1, . . . , 102.n at each of the series of PEs 124.1, 124.2, 124.3. The multiply processed data objects can then be stored to the LUN on the storage drive 126.3 and/or provided to the host computer 106 for subsequent use or analysis.

Figure 4:
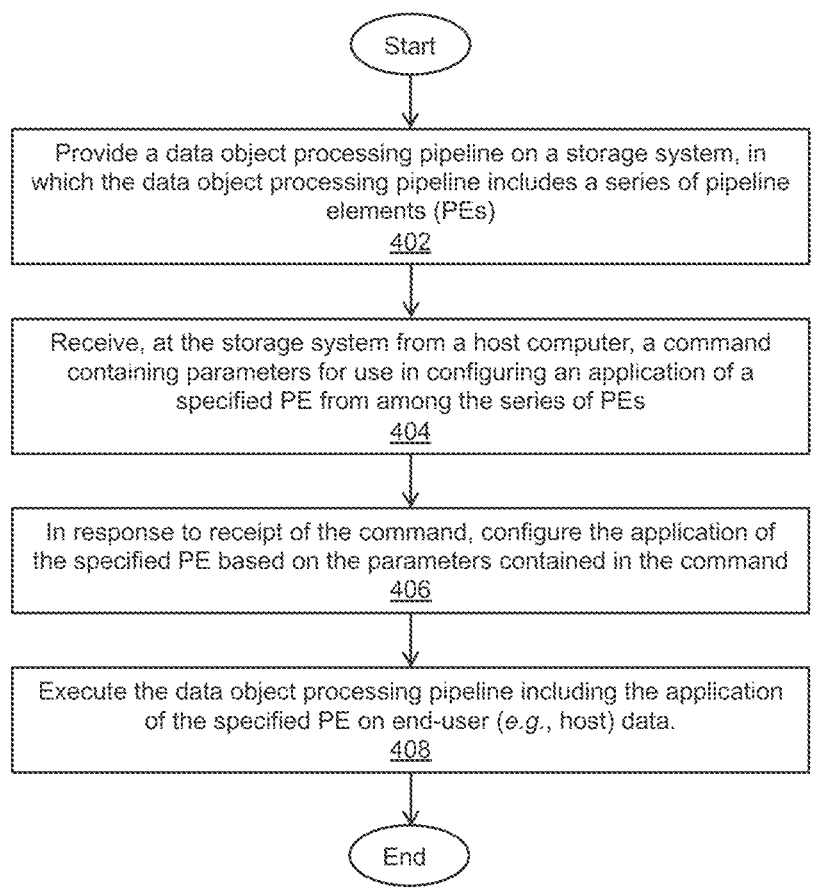
FIG. 4 is a flow diagram of an exemplary method of providing host applications the ability to dynamically manage application-specific functionality of storage applications.

An exemplary method of providing host applications the ability to dynamically manage application-specific functionality of storage applications is described below with reference to FIG. 4. As depicted in block 402, a data object processing pipeline is provided on a storage system, in which the data object processing pipeline includes a series of pipeline elements (PEs). As depicted in block 404, a command containing parameters is received, at the storage system from a host computer, for use in configuring an application of a specified PE from among the series of PEs. As depicted in block 406, in response to receipt of the command, the application of the specified PE is configured based on the parameters contained in the command. As depicted in block 408, the data object processing pipeline including the application of the specified PE are executed on end-user (e.g., host) data. In this way, the host computer is allowed to dynamically control functionality of the data object processing pipeline running on the storage system.

Having described the above illustrative embodiments, various alternative embodiments and/or variations may be made and/or practiced. For example, it was described herein that the host application 134 can execute the function library 136, which interacts with one of the customized plugins 140 of the multipath component 138 to share parameters or strings for configuring the PE application of at least one of the PEs 124.1, 124.2, 124.3 of the data object processing pipeline 124. In one embodiment, the customized plugin 140 can be configured to instantiate, via a SCSI write buffer command, a new pipeline element (PE) of the data object processing pipeline 124. In another embodiment, one or more of the PEs 124.1, 124.2, 124.3 can be preinstalled in the memory 116 of the storage system 104 via a Python program or any other suitable mechanism. In this embodiment, the Python program can have input parameters configured to control application program flow via a SCSI write buffer command issued by the host computer 106.

It was further described herein that a customized plugin 140 of the multipath component 138 can share parameters or strings for configuring the PE application 142.1 of the PE 124.1 to perform data cleaning, such as by removing faulty data from data objects read from the storage queue 122.1. In one embodiment, the IoT devices 102.1, . . . , 102.n can stream their data or information to the storage system 104, and the host computer 106 can have the task of defining record formats of data objects into which the data or information are to be written. For example, the record formats of the data objects may be different for various types or groups of the IoT devices 102.1, . . . , 102.n. In this embodiment, during data cleaning in accordance with a first SCSI write buffer command, the PE application 142.1 can be configured to look for certain fields in the record formats of the data objects, and to remove data objects if those fields in their record formats are missing. Further, during data pruning in accordance with a second SCSI write buffer command, the PE application 142.2 of the PE 124.2 can be configured to look for certain attribute (e.g., parameter) values in the fields of the record formats of the data objects, and to remove data objects if those attribute values are missing in the fields of their record formats. In addition, during data tagging in accordance with a third SCSI write buffer command, the PE application 142.3 of the PE 124.3 can be configured to apply metadata tags (or metatags) to the data objects with those attribute values in the fields of their record formats.

It was further described herein that the processing circuitry 128 of the host computer 106 can generate storage IO requests and send them to the storage system 104 for accessing host data stored on the storage array 118. In one embodiment, such storage IO requests can be interspersed with commands (e.g., SCSI write buffer commands) for dynamically managing or controlling the application-specific functionality of the data object processing pipeline 124 or other storage application running on the storage system 104.

It was further described herein that specialized code and data stored in the memory 116 can be accessed and/or executed by the storage processing circuitry 112, the host controller 114, and/or the virtual machines (VMs) to carry out the techniques and/or methods described herein. In one embodiment, the storage system 104 can include one or more additional data processing units (DPUs) and/or one or more smart network interface cards (NICs) configured to execute at least some of the specialized code and data, such as the data object processing pipeline 124.

It was further described herein that the function library 136 can be called and executed by the host application 134 to issue or send commands to specified ones of the customized plugins 140 of the multipath component 138, in accordance with the SCSI protocol. In one embodiment, the function library 136 can issue or send such commands to the customized plugins 140 in accordance with the nonvolatile memory express (NVMe) protocol, the Amazon® S3 protocol, or any other suitable protocol.

It was further described herein that the host controller 114 can build a SCSI read buffer command for use in verifying that a SCSI write buffer command executed as expected, as well as in providing any optional data or information about the execution of the SCSI write buffer command and/or the storage system 104 to the host computer 106. In one embodiment, such data or information can be provided by the storage system 104 to the host application 134 and include indications of the storage system's capacity to perform specified data processing (e.g., data cleaning, data pruning, data tagging) on ingested data, as well as directives to delay sending any additional requests to perform such data processing if the required storage processing and/or memory resources are unavailable.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)).

As employed herein, the term "storage array" may refer to a storage system used for block-based, file-based, or other object-based storage. Such a storage array may include, for example, dedicated storage hardware containing HDDs, SSDs, and/or all-flash drives.

As employed herein, the term "storage entity" may refer to a filesystem, an object storage, a virtualized device, a logical unit (LUN), a logical volume (LV), a logical device, a physical device, and/or a storage medium.

As employed herein, the term "LUN" may refer to a logical entity provided by a storage system for accessing data from the storage system and may be used interchangeably with a logical volume (LV). The term "LUN" may also refer to a logical unit number for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume."

As employed herein, the term "storage medium" may refer to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a read request or a write request.

As employed herein, the terms, "such as," "for example," "e.g.," "exemplary," and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:
   providing a data object processing pipeline application for execution on a storage system, the storage system including a plurality of storage devices, the data object processing pipeline application including a series of pipeline processing components, each pipeline processing component having a data object processing application, and being in communication with a respective storage device from among the plurality of storage devices;
   receiving, at the storage system from a host computer, a command containing parameters or strings for configuring the data object processing application of the pipeline processing component, the host computer including a function library containing one or more custom functions, and a multipath component having a pluggable architecture for supporting one or more customized plugins that use the function library, the multipath component being capable, over more than one communication path, of directing input/output (IO) requests to the respective storage device, and of sending, via a specified customized plugin from among the one or more customized plugins, the command containing the parameters or strings for configuring the data object processing application of the pipeline processing component, the host computer executing a host application, the host application executing a selected custom function from among the one or more custom functions, the executing of the selected custom function causing the specified customized plugin to build the command containing the parameters or strings for configuring the data object processing application of the pipeline processing component;
   in response to receipt of the command, dynamically controlling functionality of the data object processing pipeline application by configuring the data object processing application of the pipeline processing component based on the parameters or strings contained in the command; and
   executing the data object processing pipeline application on end-user object data.

2. The method of claim 1 wherein executing the data object processing pipeline application on the end-user object data includes processing the end-user object data at the pipeline processing component.

3. The method of claim 2 further comprising:
   storing, on the storage system, the processed end-user object data for subsequent use or analysis.

4. The method of claim 1 wherein receiving the command containing the parameters or strings includes receiving, at the storage system from the host computer, the command configured as a small computer system interface (SCSI) write buffer command, and wherein the parameters or strings are contained in a body of the SCSI write buffer command, the executing of the selected custom function causing a custom input/output control (IOCTL) command containing the parameters or strings to be sent to the specified customized plugin, the specified customized plugin building the SCSI write buffer command containing the parameters or strings in response to the custom IOCTL command.

5. The method of claim 4 further comprising:
   executing the SCSI write buffer command as a SCSI write buffer/read buffer command pair.

6. The method of claim 5 further comprising:
   sending, by the storage system to the host computer, a SCSI read buffer command portion of the SCSI write buffer/read buffer command pair, the SCSI read buffer command portion containing verification information pertaining to execution of the SCSI write buffer command and/or data or information pertaining to processing or memory resources of the storage system.

7. A computer program product including a set of non-transitory, computer-readable media having instructions that, when executed by processing circuitry, cause the processing circuitry to perform a method comprising:
   providing a data object processing pipeline application for execution on a storage system, the storage system including a plurality of storage devices, the data object processing pipeline application including a series of pipeline processing components, each pipeline processing component having a data object processing application, and being in communication with a respective storage device from among the plurality of storage devices;
   receiving, at the storage system from a host computer, a command containing parameters or strings for configuring the data object processing application of the pipeline processing component, the host computer including a function library containing one or more custom functions, and a multipath component having a pluggable architecture for supporting one or more customized plugins that use the function library, the multipath component being capable, over more than one communication path, of directing input/output (IO) requests to the respective storage device, and of sending, via a specified customized plugin from among the one or more customized plugins, the command containing the parameters or strings for configuring the data object processing application of the pipeline processing component, the host computer executing a host application, the host application executing a selected custom function from among the one or more custom functions of the function library, the executing of the selected custom function causing the specified customized plugin to build the command containing the parameters or strings for configuring the data object processing application of the pipeline processing component;

in response to receipt of the command, dynamically controlling functionality of the data object processing pipeline application by configuring the data object processing application of the pipeline processing component based on the parameters or strings contained in the command; and executing the data object processing pipeline application on end-user object data.

8. A storage system comprising:
a plurality of storage devices;
a memory containing a data object processing pipeline application,
wherein the data object processing pipeline application includes a series of pipeline processing components,
wherein each pipeline processing component has a data object processing application, and is in communication with a respective storage device from among the plurality of storage devices; and
processing circuitry configured to execute program instructions out of the memory to:
  receive, from a host computer, a command containing parameters or strings for configuring the data object processing application of the pipeline processing component,
  wherein the host computer includes a function library containing one or more custom functions, and a multipath component having a pluggable architecture for supporting one or more customized plugins that use the function library,
  wherein the multipath component is capable, over more than one communication path, of directing input/output (IO) requests to the respective storage device, and of sending, via a specified customized plugin from among the one or more customized plugins, the command containing the parameters or strings for configuring the data object processing application of the pipeline processing component,
  wherein the host computer executes a host application,
  wherein the host application executes a selected custom function from among the one or more custom functions,
  wherein the executing of the selected custom function causes the specified customized plugin to build the command containing the parameters or strings for configuring the data object processing application of the pipeline processing component;
  in response to receipt of the command, dynamically control functionality of the data object processing pipeline application by configuring the storage data object processing application of the pipeline processing component based on the parameters or strings contained in the command; and
  execute the data object processing pipeline application on end-user object data.

9. The storage system of claim 8 wherein the processing circuitry is further configured to execute the program instructions out of the memory to process the end-user object data at the pipeline processing component.

10. The storage system of claim 9 wherein the processing circuitry is further configured to execute the program instructions out of the memory to store, on a storage object, the processed end-user object data for subsequent use or analysis.

11. The storage system of claim 8 wherein at least one pipeline processing component of the series of pipeline processing components has an associated storage queue, and wherein the processing circuitry is further configured to execute the program instructions out of the memory to:
  ingest the end-user object data as data objects; and
  write each data object to the storage queue associated with the pipeline processing component.

12. The storage system of claim 11 wherein the processing circuitry is further configured to execute the program instructions out of the memory, in response to writing a data object to the storage queue, to:
  automatically trigger execution of the data object processing application associated with the pipeline processing component.

13. The storage system of claim 12 wherein the processing circuitry is further configured to execute the program instructions out of the memory, in response to automatically triggering execution of the data object processing application, to:
  read at least one data object from the storage queue; and
  perform specified processing on the data object.

14. The storage system of claim 13 wherein the processing circuitry is further configured to execute the program instructions out of the memory, in response to performing the specified processing on the data object, to:
  write the data object to a next pipeline processing component in the series of pipeline processing components or to a storage queue associated with the next pipeline processing component.

* * * * *